United States Patent [19]
Pfeil et al.

[11] Patent Number: 5,953,410
[45] Date of Patent: Sep. 14, 1999

[54] METHOD AND ARRANGEMENT FOR ECHO COMPENSATION

[75] Inventors: Dirsko Von Pfeil, Hohenschaeftlarn; Erhard Waretzi, Haar, both of Germany

[73] Assignee: Siemens Aktiengesellschaft, Munich, Germany

[21] Appl. No.: 08/938,961

[22] Filed: Sep. 26, 1997

[30] Foreign Application Priority Data

Sep. 26, 1996 [DE] Germany ............................. 196 39 703

[51] Int. Cl.[6] ......................................................... H04M 9/08
[52] U.S. Cl. ........................... 379/406; 379/410; 379/411; 370/289
[58] Field of Search ................................... 379/406, 407, 379/408, 409, 410, 411; 370/286, 289, 290, 291; 364/724.19

[56] References Cited

U.S. PATENT DOCUMENTS

| | | | |
|---|---|---|---|
| 4,688,245 | 8/1987 | Schenk | 379/410 |
| 4,937,813 | 6/1990 | Schenk | 379/410 |
| 4,956,838 | 9/1990 | Gilloire et al. | 379/410 |
| 4,972,467 | 11/1990 | Nakagawa et al. | 379/410 |
| 5,193,112 | 3/1993 | Sano | 379/410 |
| 5,230,012 | 7/1993 | Schenk | 375/362 |
| 5,263,020 | 11/1993 | Yatsuzuka et al. | 379/410 |
| 5,278,900 | 1/1994 | Van Gerwen et al. | 379/410 |
| 5,315,585 | 5/1994 | Lizuka et al. | 379/410 |

FOREIGN PATENT DOCUMENTS

| | | |
|---|---|---|
| 0 384 490 | 8/1990 | European Pat. Off. . |
| 0 439 139 | 7/1991 | European Pat. Off. . |
| 96/02981 | 2/1996 | WIPO . |

OTHER PUBLICATIONS

"Echokompensation Unter Verwendung Rekursiver Filter", Kleinheubach Bericht 26 1983, pp. 427–435.

*Primary Examiner*—Forester W. Isen
*Assistant Examiner*—Jacques M. Saint-Surin
*Attorney, Agent, or Firm*—Hill & Simpson

[57] ABSTRACT

A method for echo compensation is provided in which filter coefficients are obtained by correlation of a transmission signal and an error signal, the coefficients determining a correction signal that is subtracted from the sum signal formed from the speech signal and the echo signal so that the disturbing signal portion is eliminated. Auxiliary coefficients are determined in the same way and the absolute values of the auxiliary coefficients control the product of the transmission signal and the error signal and thus determine the time curve of the filter coefficients.

10 Claims, 2 Drawing Sheets

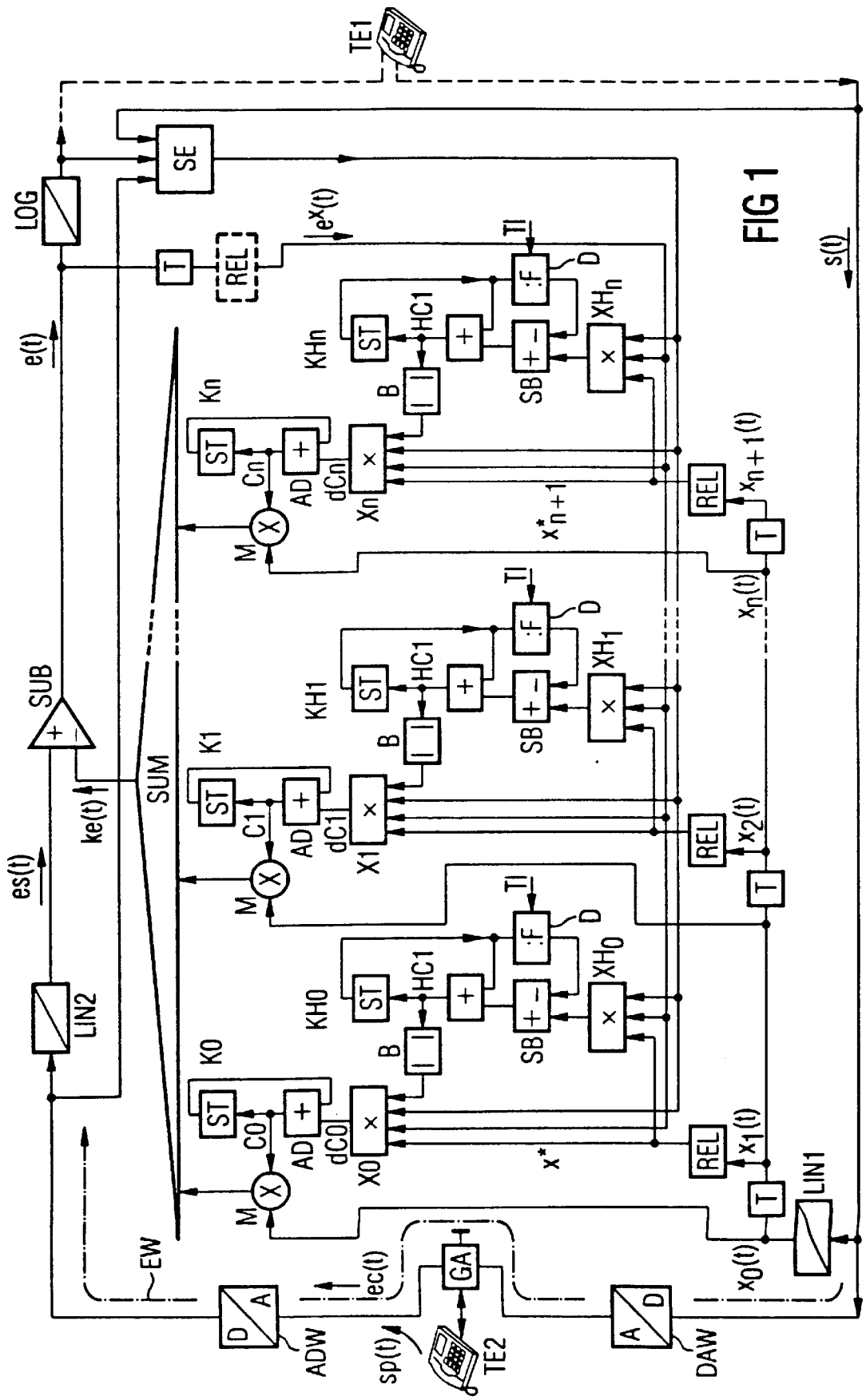

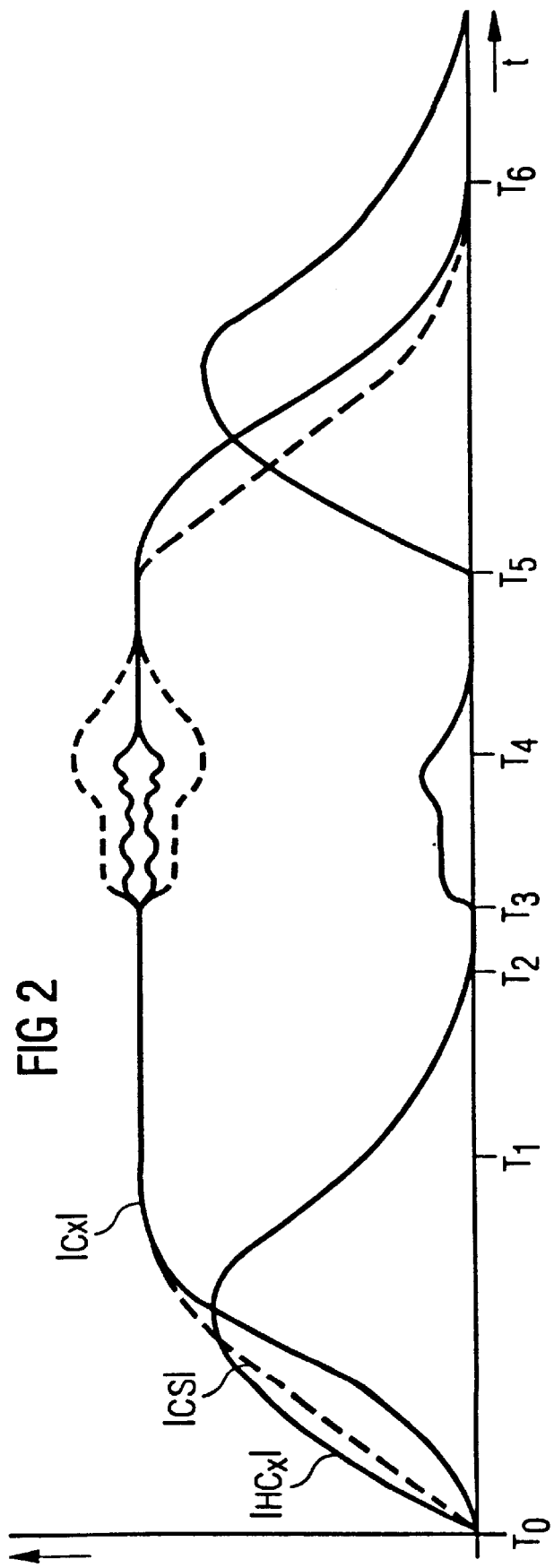

METHOD AND ARRANGEMENT FOR ECHO COMPENSATION

BACKGROUND OF THE INVENTION

1. Field of the Invention

The present invention relates generally to a method and to an arrangement for echo compensation in which a filter is provided whose filter coefficients are controlled depending upon the echo signal.

2. Description of the Related Art

Echo compensators are used in signal connections, such as in speech connections which have a long run time. The purpose of echo compensators is to compensate for disturbing signals which are called echo signals and are caused by transmission signals. The echo signals are due to incomplete decoupling of the transmission paths, such as at a terminal hybrid or at reflection points of the transmitter of a connected two-wire line.

In an echo compensator, the echo signal is emulated from the transmission signal by a filter arrangement and is then subtracted from the reception signal which is made up of the desired reception signal and an echo signal.

Higher demands are being made on echo compensators and so adaptive digital filters such as FIR filters are used which have adjustable coefficients. An echo compensator using an adjustable coefficient is disclosed in, for example, "Kleinheubacher Berichten" 26, 1983 of the Central Office for Communication Technology in Darmstadt, pp. 427–435.

On one hand, echo compensators should adjust themselves rapidly and precisely to the echo signal and, on the other hand, echo compensators should hold their setting in a stable manner when speech signals are superimposed on the echo signal such as in the case of simultaneous cross talk. Problems are a cause by loud environmental noises which are also superimposed on the echo signal. The echo compensator must be able to adjust itself despite these loud environmental noises. For a rapid adjustment, the filter coefficients must change quickly and be able to change with large increments but, on the other hand, for a precise setting which is not sensitive to noise, the filter compensation must necessarily be finely stepped.

SUMMARY OF THE INVENTION

The problem of combining a rapid compensation of the echo signal with an adjustment that is not sensitive to noise is solved by a method for echo compensation in which filter coefficients are obtained by means of correlation of a transmission signal and an error signal in which the coefficients determine a correction signal that is subtracted from the reception signal for eliminating the disturbing noise signal portion, and in particular auxiliary coefficients are determined in the same way, the absolute value of these auxiliary coefficients controlling the size of the product of the transmission signal and the error signal, and the value of the auxiliary coefficients is continuously reduced. A circuit arrangement is also provided according to the invention, wherein a filter arrangement for producing a compensation signal from the transmission signal and correlators for setting the filter coefficients are provided as well as a subtraction means to which the obtained compensation signal is supplied for eliminating the disturbing echo signals, in particular an auxiliary correlator is allocated to each of the correlators and, as is also case for the correlator, the transmission signal and an error signal are likewise supplied to the auxiliary correlator and from these signals auxiliary coefficients are determined, the absolute value being reduced step-by-step and the correlators are fashioned in such a way that the value of the product formed from the input signals is determined at the same time by the auxiliary correlators.

Further developments of the invention are provided in a method wherein a constant fraction of the value of the auxiliary coefficient is continuously subtracted. On the other hand, a constant amount is continuously subtracted from the absolute value of the auxiliary coefficient. In a preferred development, only the prefix bit of the error signal is used for determining the filter coefficients and the auxiliary coefficients.

To determine the filter coefficients and the auxiliary coefficients in one embodiment, a relativized error signal is used, the relativized error signal compensating the different amplitudes of the error signal at least to a large extent. Alternately, to determine the filter coefficients and the auxiliary coefficients, a relativized transmission signal is used whose signal compensates the different amplitudes of the transmission signal at least to a large extent.

The apparatus is likewise improved in preferred embodiments by providing a signal converter that converts a PCM-coded transmission signal into a linearly coded transmission signal. In one embodiment, a relativization means is connected before the correlators and auxiliary correlators, the relativization means compensates at least to a large extent the amplitudes of different transmission signals that fluctuate in loudness.

In an embodiment of the echo compensation arrangement, the auxiliary correlator contains a divider which divides the stored value of the auxiliary coefficient by a factor of less than one and contains a subtractor that is connected before the memory of the correlator.

The acquisition and application of auxiliary coefficients for controlling the regulation means has proved to be particularly advantageous. The auxiliary coefficients are determined from the same signals as the filtered coefficients, but the auxiliary coefficients are continuously made smaller so that after correlation has taken place they reach values that fluctuate about value zero.

It has proved advantageous to reduce the auxiliary coefficients by a constant fraction of their current size. By doing this, a reduction results that is at first rapid and then becomes slower. Furthermore, the use of a speech recognition means that blocks the correlators in the case of cross talk is also useful.

Depending upon the desired control behavior, the auxiliary coefficient can also be reduced at all times by a constant amount, or reduced according to a predetermined algorithm.

BRIEF DESCRIPTION OF THE DRAWINGS

The present invention is explained in greater detail on the basis of an exemplary embodiment as illustrated in the figures.

FIG. 1 is a schematic block diagram of an echo compensator arrangement according to the principles of the present invention; and FIG. 2 is a time diagram of signals in the present echo compensation arrangement.

DETAILED DESCRIPTION OF THE PREFERRED EMBODIMENTS

An echo compensator is shown in FIG. 1 which is designed for use with PCM-coded signals. A telephone connection is provided between a first subscriber TE1 and a second subscriber TE2 which is of a run time with a length such that the transmission signal s(t) produced by the first subscriber TE1 is noticeable via the echo path EW as a disturbing echo signal ec(t). The echo signal ec(t) is due to the insufficient decoupling of the transmission signal path and the reception signal path. A long run time for the transmission signal s(t) can be caused by the length of the path, such as in a satellite connection or very long cable, but also can be caused by encoding of the signals which may serve, for example, for bit rate reduction or for error correction. The disturbing echo signals mainly arise in the termination hybrid circuit GA of the second subscriber TE2 to whom the transmission signal s(t) is supplied via a digital-analog converter DAW as an analog signal. The analog echo signal is superimposed on the speech signal sp(t) and is converted with this signal into a digital sum signal es(t). The echo compensator of the present invention includes a run time chain formed by registers T which, together with multipliers M and a summation unit SUM, form a transverse filter. The transmission signal s(t) which is converted into linear signal values $x_0(t)$, $x_1(t)$, $x_2(t)$, $x_3(t), \ldots, x_n(t)$, is supplied to this transverse filter. The registers T operate with a clock pulse of the transmitted data words or sampled values.

Since compressed PCM-coded data are transmitted, it is useful to first convert these modulated data back into linear data. This conversion takes place in a linearizer LIN1. A corresponding linearizer LIN2 and a logarithmation module LOG is used in the other direction of transmission.

Relativization means REL, which are known to those of skill in the art, are connected in front of correlators K0 to Kn. The relativization means REL relate the current amplitude values to the preceding amplitude values (which may be the mean values, the effective values, or the peak values). A standardization takes place to some extent, leading to relativized signal values $x^*_0, \ldots, x^*_{n+1}$.

For the following description of the manner of operation of the present device, it is first assumed that no cross talk takes place.

Using the transverse filter, the echo equalizer produces a correction signal ke(t) which emulates the echo signal ec(t) as precisely as possible and which is subtracted from this echo signal. The remaining error signal (which is a residual echo signal) e(t) controls the correlators KO through Kn. The correlators consist respectively of a simple multiplier X0, X1 . . . Xn of a summation circuit formed from a memory ST and a summation unit AD. Each correlator KO, . . . Xn calculates a filter coefficient C0, C1, . . . Cn, by which the transmission signal s(t) is multiplied in one of the multipliers M, after conversion and different delaying in the registers of the transverse filter. Another matching to the orders of magnitude of the summed value and to the required filter coefficients is often required, this matching being carried out by a circuit inserted between the correlator and the allocated multiplier or by displacement of the binary digits. The signal portions emitted by the multipliers are combined in a summation unit SUM to form the correction signal ke(t).

An auxiliary correlator KH0 to KHn is allocated to each correlator K0 through Kn. The same input values that were supplied to the allocated correlator are supplied to multipliers XH0, XH1, . . . , XHn of the auxiliary correlators; however, the stored auxiliary coefficient is regularly reduced with the occurrence of a clock pulse signal TI. The time interval of the clock pulse TI is, for example, 4 ms. The reduction of the auxiliary coefficient is performed by a divider D and a subtractor SUB. In the case of a missing and/or uncorrelated signal, the auxiliary coefficient is thus altered in the direction towards zero. From the auxiliary coefficient, the absolute value of the auxiliary coefficient HC0, HC1, . . . HCn, is formed in an absolute value generator B. The absolute value controls the respective allocated multipliers X0, X1, . . . Xn of the associated correlator K0, K1, . . . Kn in such a way that, given a small absolute value of the auxiliary coefficients HC0, HC1, . . . HCn, the product dC0, dC1, . . . dCn of the relativized transmission signal $x^*_0(t), \ldots, x^*_n(t)$ and the error signal e(t) is additionally multiplied by a small factor, while, for large values of the auxiliary coefficient, a correspondingly larger factor is used. As a result, the correlation product dC0, dC1, . . . dCn is strongly dependent on the auxiliary coefficient.

In addition, it is noted that it can be sufficient to use only the prefix bit of the error signal and the highest-valued bits of the auxiliary coefficient in the echo compensation. Likewise, it is often sufficient to use, for example, the three highest-valued bits of the relativized signal, which are three highest-valued changing bits of the linear signal. In the same way as the relativized transmission signal $x^*(t)$, a relativized error signal, or residual echo signal, $e^*(t)$ can also be used, which compensates for fluctuations in loudness.

By means of the present control process, all filter coefficients are adjusted so that a minimal error signal e(t) results. As far as possible, the control process is carried out only when no cross talk is taking place.

In case of cross talk, a speech signal sp(t) of the second subscriber TE2 is transmitted to the first subscriber TE1, and the undesired echo signal ec(t) is superimposed on the speech signal sp(t). In place of the echo signal, the sum signal es(t) at the transmission path input of the second subscriber TE2 is supplied to the subtractor SUB.

The control process is made more difficult by cross talk. A speech recognition means SE sees to it that the control process is interrupted if certain conditions are fulfilled that indicate the presence of cross talk. For example, if the sum signal es(t) is greater than the transmission signal s(t) of the first subscriber TE1, then cross talk is present.

The schematic diagram of FIG. 1 which shows the present circuit may be simplified in terms of its circuitry, for example, by using parts of the multipliers of the correlators and auxiliary correlators in common or are realizing parts as an arithmetic-logic unit.

Referring to FIG. 2, a time curve illustrating one of the filter coefficients $C_x$ and of an associated auxiliary coefficient $HC_x$ is shown. It is assumed that at time $T_0$ the coefficients are zero and correlated signals are present.

If the absolute value of the auxiliary coefficient is still small, then at the beginning the filter coefficient $K_x$ will nonetheless increase only very slowly. For comparison, the function CS shows the increase of the filter coefficient of a conventional compensator without the charging with the auxiliary coefficient. If the absolute value of the auxiliary coefficient then increases sharply due to the correlation between the transmission signal and the echo or the error signal, the increment of the filter coefficient increases continuously, until, towards the end of the compensation process, the auxiliary coefficient again becomes smaller. This is because the error signal has also become smaller and outweighs the periodic reduction. In addition, the rate of change of the filter coefficient also decreases so that a very stable and precise compensation is achieved. The control process is terminated at a time $T_1$. The remaining error signal is not correlated or has an extremely low amplitude. Since the auxiliary coefficient is now continuously further reduced, its value decreases until it becomes zero at a time $T_2$.

In the exemplary embodiment, the reduction of the auxiliary coefficient takes place by dividing its current value by a constant factor F, for example, 64, and subtracting it from the current value in a subtractor SUB. According to the desired curve of the filter coefficient, the current value can also be reduced by constant amounts. The function can also be switched over or limited by means of threshold values to certain phases of the control process.

By a suitable dimensioning, the "turning point" for the maximum of the auxiliary coefficient can be determined towards the end of the compensation process.

If the value of the auxiliary coefficient $HC_x$ has again become very small, this once again prevents a rapid change of the filter coefficient.

A great advantage of the present circuit is apparent from the foregoing. If, for example, the cross talk of the second subscriber TE2 has not yet been recognized between the times $T_3$ and $T_4$, which would have caused an interruption of the control process, the auxiliary coefficients can indeed change rapidly due to accidental correlation, but they will not reach larger values because disturbing signal portions are not correlated with the transmission signal s(t), and correlated signals are the precondition for a greater increase of the auxiliary coefficients. However, small auxiliary coefficients mean a retarded, or slowed, controlling of coefficients; thus, only small changes in the filter coefficients $C_x$ result. The control process is, thus, extremely stable.

Even when the second subscriber TE2 is located in a loud environment without the subscriber speaking, it is advantageous that the control process takes place with a small increment, so that the compensator can adjust itself slowly without accidental correlations making the control process unstable.

At a time $T_5$, the relations on the transmission path change. A new control process takes place, which is terminated at the time $T_6$.

The function shown in FIG. 2, which reproduces the curve of one of the filter coefficients, can of course be matched to the transmission system requirements. The circuit can be dimensioned in such a way that a final value is reached more quickly. Nonetheless, after reduction of the auxiliary coefficient, a precise control ensues, since the changes of the filter coefficient becomes smaller once again. By this means, the circuit again becomes insensitive to interference signals.

Under optimal conditions, and given correct dimensioning, the known method may provide a compensation that is approximately as fast as that of the present method. However, under problematic conditions, such as interfering noises or cross talk, the method according to the present invention is far superior, due to its greater stability.

Although other modifications and changes may be suggested by those skilled in the art, it is the intention of the inventors to embody within the patent warranted hereon all changes and modifications as reasonably and properly come within the scope of their contribution to the art.

We claim:

1. A method for echo compensation in a signal transmission system, comprising the steps of:

correlating a transmission signal and an error signal to obtain filter coefficients;

determining a correction signal from said filter coefficients;

subtracting said correction signal from a reception signal to substantially eliminate a disturbing signal portion;

determining auxiliary coefficients by correlating said transmission signal and said error signal;

obtaining an absolute value of said auxiliary coefficients;

controlling a size of a product of said transmission signal and said error signal using said absolute value; and continuously reducing said auxiliary coefficients.

2. A method for echo compensation as claimed in claim 1, wherein said step of continuously reducing said auxiliary coefficients includes continuously subtracting a constant fraction of value of said auxiliary coefficients from said auxiliary coefficients.

3. A method for echo compensation as claimed in claim 1, wherein said step of continuously reducing said auxiliary coefficients includes continuously subtracting a constant amount from said auxiliary coefficients.

4. A method for echo compensation as claimed in claim 1, wherein said step of determining said filter coefficients and said step of determining said auxiliary coefficients uses a prefix bit of said error signal.

5. A method for echo compensation as claimed in claim 1, wherein said error signal is a relativized error signal, said relativized error signal substantially compensating different amplitudes of a non-relativized error signal.

6. A method for echo compensation as claimed in claim 1, wherein said steps of determining said filter coefficients and said step of determining said auxiliary coefficients uses a relativized transmission signal, said relativized transmission signal substantially compensating different amplitudes of a non-relativized transmission signal.

7. An apparatus for echo compensation in a signal transmission system, comprising:

a filter arrangement means for producing a compensation signal from a transmission signal;

correlator means for setting filter coefficients from the transmission signal and an error signal;

subtraction means for subtracting the compensation signal from the transmission signal to substantially eliminate disturbing echo signals;

an auxiliary correlator allocated to each of said correlator means and receiving the transmission signal and the error signal, said auxiliary correlator determining auxiliary coefficients;

an absolute value means for obtaining an absolute value of said auxiliary coefficients;

means for reducing said absolute value of said auxiliary coefficients step-by-step; and said correlator means determining a value of a product of input signals at a same time as said auxiliary correlators.

8. An apparatus for echo compensation as claimed in claim 7, wherein said transmission signal is a PCM-coded transmission signal, and further comprising:

a signal converter connected to convert said PCM-coded transmission signal into a linearly coded transmission signal.

9. An apparatus for echo compensation as claimed in claim 7, further comprising:

a relativization means connected before said correlators and said auxiliary correlators, for compensating at least to a large extent, amplitudes of different transmission signals that fluctuate in loudness.

10. An apparatus for echo compensation as claimed in claim 7, wherein said auxiliary correlator includes:

a divider that divides a stored value of the auxiliary coefficient by a factor >1; and a subtractor connected before said memory of said correlator.

* * * * *